(12) United States Patent
Valloppillil et al.

(10) Patent No.: US 10,592,595 B2
(45) Date of Patent: Mar. 17, 2020

(54) MAINTAINING MULTIPLE VERSIONS OF A COLLECTION OF CONTENT ITEMS

(71) Applicant: Dropbox, Inc., San Francisco, CA (US)

(72) Inventors: Vinod Valloppillil, Berkeley, CA (US); Henry Liu, Berkeley, CA (US); Ryhan Hassan, San Francisco, CA (US); Eric Sprauve, San Francisco, CA (US); Jong-Moon Kim, San Francisco, CA (US); Francesco Paduano, San Francisco, CA (US); Jane Davis, Oakland, CA (US); David Fish, San Francisco, CA (US); Jacob Hurwitz, San Francisco, CA (US); Kate Rudolph, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 96 days.

(21) Appl. No.: 15/721,158

(22) Filed: Sep. 29, 2017

(65) Prior Publication Data
US 2019/0102369 A1   Apr. 4, 2019

(51) Int. Cl.
*G06F 17/22* (2006.01)
*H04L 29/06* (2006.01)
(Continued)

(52) U.S. Cl.
CPC .......... *G06F 17/2288* (2013.01); *G06F 16/11* (2019.01); *G06F 16/2358* (2019.01);
(Continued)

(58) Field of Classification Search
CPC . G06F 16/2358; G06F 17/241; G06F 17/2288
See application file for complete search history.

(56) References Cited

U.S. PATENT DOCUMENTS

| | | | |
|---|---|---|---|
| 5,883,986 | A | 3/1999 | Kopec et al. |
| 6,675,355 | B1 * | 1/2004 | Demopoulos ....... G06F 17/2247 715/233 |

(Continued)

FOREIGN PATENT DOCUMENTS

| | | |
|---|---|---|
| JP | 2002091818 | 3/2002 |
| JP | 2005129018 | 5/2005 |
| WO | 2014/100782 | 6/2014 |

OTHER PUBLICATIONS

Garfinkel, "Automating Disk Forensic Processing with SleuthKit, XML, and Python", Systematic Approaches to Digital Forensic Engineering, May 21, 2009, SADFE '09, Fourth International IEEE Workshop, 2 pages.

(Continued)

*Primary Examiner* — Asher D Kells
(74) *Attorney, Agent, or Firm* — DLA Piper LLP (US)

(57) ABSTRACT

Disclosed are systems, methods, and non-transitory computer-readable storage media for copying content from a rendered document into another document. The disclosed technology addresses the need in the art to maintain a version of a collection of content items that includes changes and/or comments from a first group of users, and provide a second version of the collection of content items to an external user that does not include internal comments and/or visible changes. The solution may provide a work product that appears complete and/or professional to the second group of users, while the first group of users continue to update and/or collaborate on the first version of the collection of content items.

21 Claims, 13 Drawing Sheets

(51) Int. Cl.
  *G06F 17/24* (2006.01)
  *G06F 16/27* (2019.01)
  *G06F 16/93* (2019.01)
  *G06F 16/23* (2019.01)
  *G06F 16/11* (2019.01)
(52) U.S. Cl.
  CPC .............. *G06F 16/27* (2019.01); *G06F 16/93* (2019.01); *G06F 17/241* (2013.01); *H04L 63/0807* (2013.01); *H04L 63/101* (2013.01); *H04L 63/08* (2013.01)

(56) References Cited

U.S. PATENT DOCUMENTS

| | | | |
|---|---|---|---|
| 7,496,886 | B2 | 2/2009 | Puttaswamy et al. |
| 8,380,796 | B2 | 2/2013 | Robertson et al. |
| 8,498,994 | B2 | 7/2013 | Prabaker et al. |
| 8,826,147 | B2 | 9/2014 | Sitrick et al. |
| 8,856,132 | B2 | 10/2014 | Harischandrakar et al. |
| 9,087,320 | B2 | 7/2015 | Goldman et al. |
| 9,189,756 | B2 | 11/2015 | Gilbert et al. |
| 9,189,770 | B2 | 11/2015 | Greene et al. |
| 9,275,161 | B2 | 3/2016 | Kass et al. |
| 9,531,652 | B2 | 12/2016 | Debenedictis et al. |
| 2006/0050312 | A1 | 3/2006 | Takiyama et al. |
| 2006/0085477 | A1 | 4/2006 | Phillips et al. |
| 2006/0193518 | A1 | 8/2006 | Dong et al. |
| 2007/0162432 | A1 | 7/2007 | Armstrong et al. |
| 2008/0005235 | A1 | 1/2008 | Hegde et al. |
| 2008/0189399 | A1 | 8/2008 | Quoc et al. |
| 2009/0259441 | A1 | 10/2009 | Yoshikai et al. |
| 2009/0327305 | A1 | 12/2009 | Roberts et al. |
| 2011/0035323 | A1 | 2/2011 | Hamilton et al. |
| 2011/0047484 | A1 | 2/2011 | Mount et al. |
| 2011/0078191 | A1 | 3/2011 | Ragnet et al. |
| 2011/0246869 | A1* | 10/2011 | Vion-Dury .......... G06F 17/2211 715/229 |
| 2012/0063367 | A1 | 3/2012 | Curtis et al. |
| 2012/0110445 | A1 | 5/2012 | Greenspan et al. |
| 2012/0192086 | A1 | 7/2012 | Ghods et al. |
| 2013/0036369 | A1 | 2/2013 | Mitchell et al. |
| 2013/0185252 | A1* | 7/2013 | Palmucci ................ G06F 16/93 707/608 |
| 2013/0246901 | A1* | 9/2013 | Massand .................. G06F 17/24 715/229 |
| 2013/0262420 | A1 | 10/2013 | Edelstein et al. |
| 2014/0055400 | A1 | 2/2014 | Reuschel |
| 2014/0089306 | A1 | 3/2014 | Rana et al. |
| 2014/0164255 | A1 | 6/2014 | Daly et al. |
| 2014/0258350 | A1 | 9/2014 | Duval et al. |
| 2014/0280463 | A1* | 9/2014 | Hunter ................. G06Q 10/101 709/203 |
| 2014/0331126 | A1* | 11/2014 | Hunter ................ G06F 17/2288 715/256 |
| 2015/0007055 | A1 | 1/2015 | Lemus et al. |
| 2015/0199411 | A1* | 7/2015 | Greenspan .......... G06F 16/2474 715/229 |
| 2015/0324381 | A1 | 11/2015 | Brand et al. |
| 2016/0057154 | A1 | 2/2016 | Ferguson et al. |
| 2016/0063321 | A1 | 3/2016 | Reese et al. |
| 2016/0110403 | A1 | 4/2016 | Lomet et al. |
| 2016/0259508 | A1* | 9/2016 | Eccleston ............. G06F 3/0484 |
| 2016/0314318 | A1 | 10/2016 | Li et al. |
| 2017/0090704 | A1 | 3/2017 | Hu et al. |
| 2017/0139550 | A1 | 5/2017 | Milvaney et al. |
| 2017/0177182 | A1 | 6/2017 | Wong et al. |
| 2017/0177965 | A1 | 6/2017 | Gordo et al. |

OTHER PUBLICATIONS

Aionaaka, "Calhoun: The NPS Institutional Archive DSpace Repository Motivating language and empathic leadership drives aircraft readiness", Mar. 2017, 59 pages.

International Search Report and Written Opinion for PCT Application No. PCT/US2018/048011 dated Jul. 11, 2018, 11 pages.

Bijalwan D.C., et al., "Automatic Text Recognition in Natural Scene and its Translation into User Defined Language," 2014 International Conference on Parallel, Distributed and Grid Computing (PDGC), IEEE, Dec. 11, 2014, pp. 324-329.

Fleishman G., "Best Online Storage Services for Small Businesses," PCWorld, Apr. 12, 2011, retrieved from http://www.pcworld.com/article/224905/online_storage_for_businesses.html on Aug. 19, 2014, 3 pages.

Herlihy M.P., et al., "Linearizability: A Correctness Condition for Concurrent Objects," ACM Transactions on Programming Languages and Systems, vol. 12 (3), Jul. 1990, pp. 463-492.

International Search Report and Written Opinion for PCT Application No. PCT/US2014/039707 dated Oct. 9, 2014, 13 pages.

Kaur D., et al., "Machine Printed Gurumukhi Numerals Recognition using Convolutional Neural Networks," International Research Journal of Engineering and Technology (IRJET), vol. 3 (8), Aug. 2016, pp. 555-558.

Pellicer J.P., "Neural Networks for Document Image and Text Processing," Neural Networks for Document Image and Text Processing, Sep. 2017, 327 pages.

Ryan, "What are Collaboration Folders and How do I use them?," Aug. 15, 2011, Support.box.com, retrieved from https://web.archive.org/web/20130425025610/https://support.box.com/entries/20358617-What-are-Collaboration-Folders-and-how-do-I-use-them-, Sep. 15, 2014, 1 page.

Sabbir A., et al., "Concurrency Control Frameworks for Interactive Sharing of Data Spaces in Real-time Distributed Collaborations," DS-RT'05, Proceedings of the 2005 Ninth IEEE International Symposium on Distributed Simulation and Real-Time Applications Electrical Contacts, 2005, 9 pages.

Sugarsync, "Sharing a Folder," XP002728686, retrieved from: https://web.archive.org/web/20120504090157/http://www.sugarsync.com/online-help/Sharing_Folders.htm, Aug. 19, 2014, 1 page.

Van Renesse R., et al., "Chain Replication for Supporting High Throughput and Availability," USENIX Association, OSDI'04, 6th Symposium on Operating Systems Design and Implementation, 2004, pp. 91-104.

* cited by examiner

800

Project Tiburon  ⊙Sharing settings
12 members, 1 outside Acme

To: Email, name or group | Can view ▾

- Matt Bond - viewing now — Owner
  mattbond@dropbox.com
- Yi Wei - viewed 2 days ago — Can edit ▾
  yi@yi.com - Outside Netflix
- Tony DeVincenzi — Can edit ▾
  tony@dropbox.com
- James LaCroix — Can edit ▾
  james@dropbox.com
- Sandy Doubleday — Can edit ▾
  Sandy@dropbox.com Link is off - only invited members can access | Link settings

815

Collection Name
Shared XYZ Times 802

To: Email, name or group 804

☐ User 1
☐ User 2  } 806

Shared Link http://collections.dropbox.com/abc123 | Copy Clipboard
810

830

📁 Chime Uploads                                    ×

To: [👤 Jong-Moon Kim ×]                     Can Edit ▾

Add a message
(optional)

812

⊙ Folder settings                                Share

FIG. 8

MAINTAINING MULTIPLE VERSIONS OF A COLLECTION OF CONTENT ITEMS

TECHNICAL FIELD

The present disclosure generally relates to maintaining multiple versions of a collection of content items, and more specifically, to granting access to a particular version of the collection of content items based on an access control list (ACL), and to maintaining, at a first version of the collection of content items, analytical information related to interactions with a second version of the collection of content items.

BACKGROUND

A first group of users may create a collection of content items that is shared with a second group of users. In certain scenarios, a first group of users may want to control what is seen by the second group of users. For example, if both the first group of users and the second group of users have access to the same version of the collection of content items, internal comments and/or changes to the one or more content items in the collection may be visible to the second group of users when the one or more content items in the collection is being revised by the first group of users. Consequently, a work product (e.g., collection of content items) with internal comments (e.g., by the service provider) and/or visible changes may result in a work product that looks incomplete and/or unprofessional.

Thus, there is a need to provide a collection of content items to a second group of users that does not include internal comments and/or visible changes.

BRIEF DESCRIPTION OF THE DRAWINGS

FIG. 8 is an illustration of a user interface rendering a plurality of pop-up boxes that may be used to share a collection of content items in accordance with an example embodiment;

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

The present application is directed to computer implemented methods, apparatuses and non-transitory computer readable mediums that may enable "Premium Sharing" by providing different versions of a collection of content items. For example, a first version of the collection of content items and a second version of the collection of content items may both be accessible by a first group of users (e.g., one or more internal users), and a second version of the collection of content items may be accessible by a second group of users (e.g., one or more external users). However, the first version of the collection of content items (e.g., may include comments, edits, redline, changes, a marked version, etc.) may not be accessible to the second group of users. The terms item(s), content item(s), and content may be used interchangeably in the present application.

A content item in a collection may be specific to the collection or may be kept up to date when revisions are ongoing at the first version of the collection of content items. For example, the target content item in the second version of the collection may or may not update as the content item in the first version of the collection is updated. The feature of updating the source content item may be turned on and/or off for individual files, tiles, and/or for the whole collection. When turned off, a target content item may be frozen for review by the second group of users, e.g., client review, which may result in a work product that appears complete and/or professional to the second group of users.

System Overview

Figure 1:
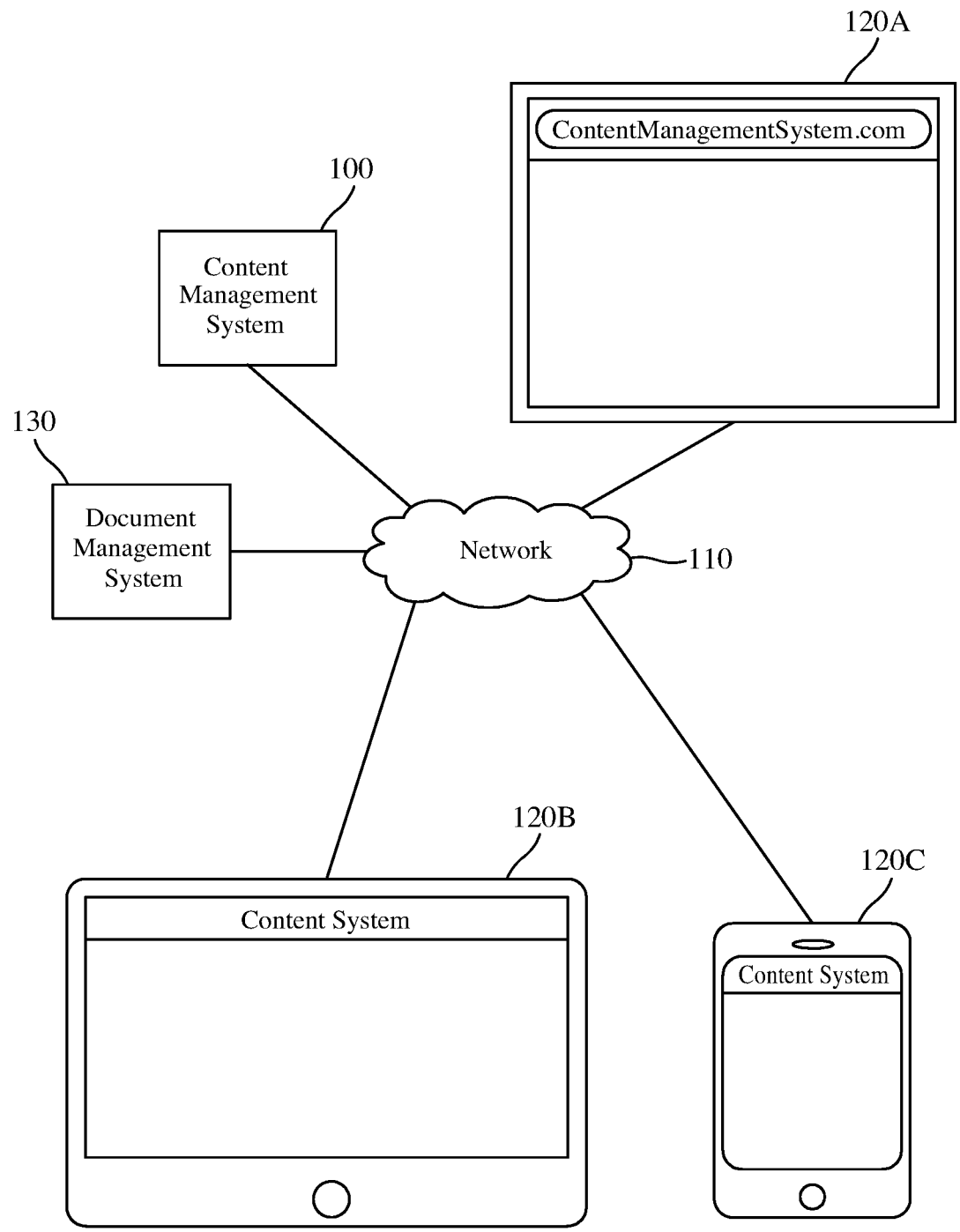
FIG. 1 is a system diagram of a system environment of a content management system and a content management system in accordance with an example embodiment.

FIG. 1 shows a system environment including a content management system 100, a content management system 130 and client devices 120A, 120B, 120C (collectively or individually "120"). The content management system 100 provides content item sharing, synchronization for users of the client devices 120. These services allow users to share content item with other users of client devices 120. In addition to content item sharing, content management system 100 may update shared content items responsive to changes and enables users to synchronize changes in content items across multiple client devices 120. A user may synchronize content items across multiple client devices 120 owned by the user and associated with the user's account, and the user may share content that is synchronized with devices associated with other users' accounts. The content items stored by content management system 100 may include any type of data, such as digital data, documents, media (e.g., images, photos, videos, audio, streaming content), data files and databases, source and object code, recordings, and any other type of data or file. The content items stored by content management system 100 may be organized in one configuration in folders, tables, or in other database structures (e.g., object oriented, key/value etc.). In one embodiment, the content items shared by content management system 100 may include content items created by using third party applications, e.g., word processors, video and image editors, database management systems, spreadsheet applications, code editors, and so forth, which are independent of content management system 100.

Users may create accounts at content management system 100 and store content items thereon by transmitting such content from client device 120 to content management system 100. The content items provided by users may be associated with user accounts that may have various privileges. The privileges may include viewing the content item, modifying the content item, modifying user privileges related to the content item, and deleting the content item.

Content management system 130 may provide users of the client devices 120 with the ability to create, store, access, and share content items. Content items may include computer files that a user may create using a document editor, such as a document editor which may be hosted by the content management system 130, or a document editor 270 (e.g., shown in FIG. 2) provided on client device 120.

Client Device

Figure 2:
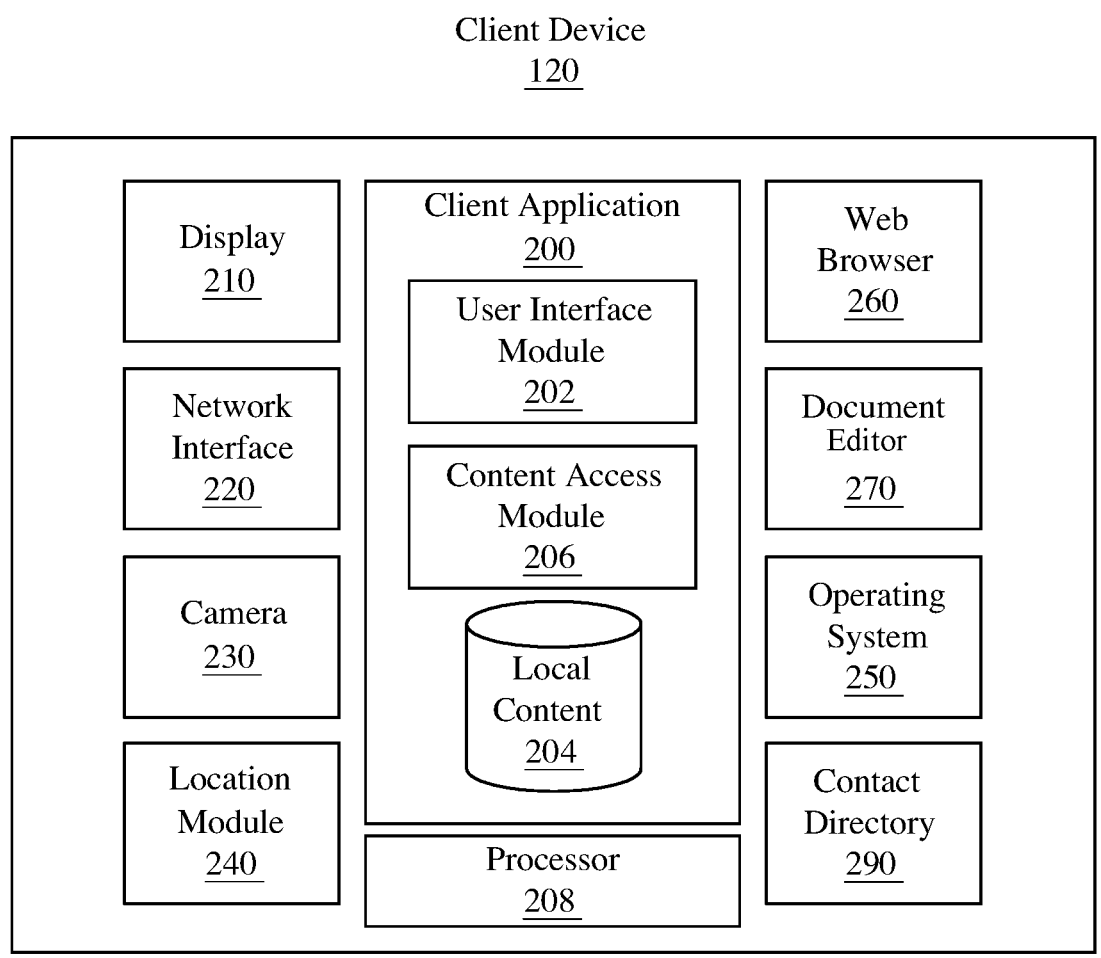
FIG. 2 is a block diagram of the components of a client device in accordance with an example embodiment.

FIG. 2 shows a block diagram of the components of the client device 120 according to one embodiment. Client devices 120 generally include devices and modules for communicating with content management system 100 and a user of client device 120. Client device 120 may include a display 210 for providing information to the user, and in certain client devices 120 includes a touchscreen. Client device 120 may also include a network interface 220 for communicating with content management system 100 via network 110. Client device 120 may include one or more processors 208 for executing software, modules and/or components. Other components of a client device 120 that are not material are not shown, for example, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and optionally a document editor 270. Document editor 270 is configured for creating, viewing and modifying content items such as text documents, code files, mixed media files (e.g., text and graphics), presentations or the like. Operating system 250 and/or the one or more processors 208 on each device provides a local file management system and executes the various software modules such as content management system client application 200 and document editor 270. A contact directory 290 stores information on the user's contacts, such as name, telephone numbers, company, email addresses, physical address, website URLs, and the like.

Client devices 120 communicate with content management system 100 and content management system 130 through network 110. The network may be any suitable communications network for data transmission. In one embodiment, network 110 is the Internet and uses standard communications technologies and/or protocols. Thus, network 110 may include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 may be represented using technologies and/or formats including the hypertext markup language (HTML), the extensible markup language (XML), etc. In addition, all or some of links may be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Client devices 120 may access content management system 100 and content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 may manage access to content management system 100 and content management system 130. Client application 200 may include user interface module 202 that generates an interface to the content items accessed by client application 200 and is one means for performing this function. The generated interface is provided to the user by display 210. Client application 200 may store content items accessed from a content storage at content management system 100 in local content 204. While represented here as within client application 200, local content 204 may be stored with other data for client device 120 in non-volatile storage. When local content 204 is stored this way, the content items are available to the user and other applications or modules, such as document editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

In certain embodiments, client device 120 may include additional components such as camera 230 (e.g., that may be used to capture images and/or videos) and location module 240. Location module 240 may determine the location of client device 120, using, for example, a global positioning satellite signal, cellular tower triangulation, or other methods. Location module 240 may be used by client application 200 to obtain location data and add the location data to metadata about a content item.

Content Management System

Figure 3:
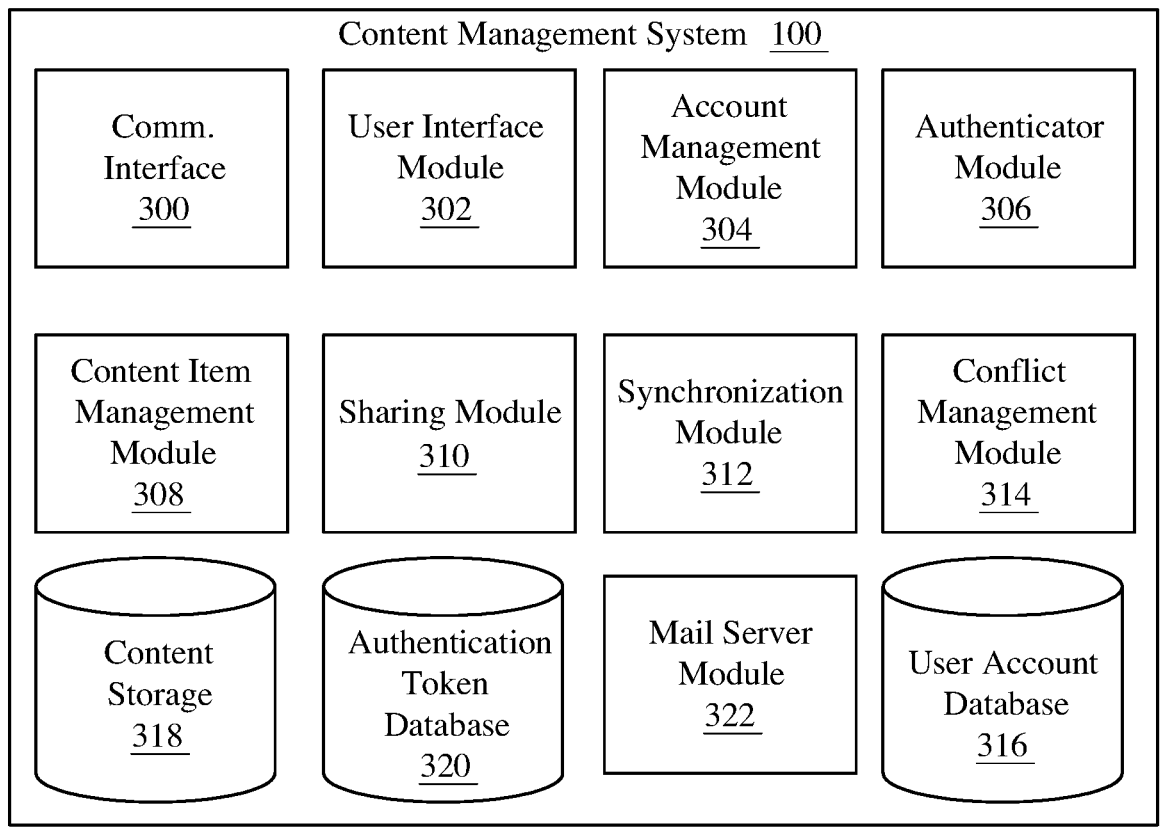
FIG. 3 is a block diagram of the content management system in accordance with an example embodiment.

FIG. 3 shows a block diagram of the content management system 100 according to one embodiment. To facilitate the various content management services, a user may create an account with content management system 100. The account information may be maintained in user account database 316, and is one means for performing this function. User account database 316 may store profile information for registered users. In some cases, the only personal information in the user profile may be a username and/or email address. However, content management system 100 may also be configured to accept additional user information, such as password recovery information, demographics information, payment information, and other details. Each user is associated with a userID and a user name. For purposes of convenience, references herein to information such as content items or other data being "associated" with a user are understood to mean an association between a content item and either of the above forms of user identifier for the user. Similarly, data processing operations on content items and users are understood to be operations performed on corresponding identifiers such as content_itemID and userIDs. For example, a user may be associated with a document by storing the information linking the userID and the content_itemID in a table, file, or other storage formats. For example, a database table (e.g., ACL) organized by content_itemIDs may include a column listing the userID of each user associated with the document. As another example, for each userID, a file may list a set of content_itemIDs associated with the user. As another example, a single file may list key values pairs such as <userID, content_itemID> representing the association between an individual user and a content item. The same types of mechanisms may be used to associate users with comments, threads, text elements, formatting attributes, and the like.

User account database 316 may also include account management information, such as account type, e.g. free or paid; usage information for each user, e.g., file usage history; maximum storage space authorized; storage space used; content storage locations; security settings; personal configuration settings; content sharing data; etc. Account management module 304 may be configured to update and/or obtain user account details in user account database 316. Account management module 304 may be configured to interact with any number of other modules in content management system 100.

Mail server module 322 may be used to generate a notification (e.g., an email, a pop-up box, or both) that includes information associated with a collection of content items that is sent to one or more users in either the first group of users and/or the second group of users. The information included in the notification may be a link to access the collection of content items. In certain aspects, the mail server module 322 may be used to send and/or receive emails.

An account may be used to store content items, such as documents, audio files, video files, etc., from one or more client devices associated with the account. The content may also include folders of various types with different behaviors, or other content item grouping methods. For example, an account may include a public folder that is accessible to any user. The public folder may be assigned a web-accessible address. A link to the web-accessible address may be used to access the contents of the public folder. In another example, an account may include one or more of photos folders, audio folders, video folders, other special purpose folders or any combination thereof. A photos folder is intended for storing photos and may provide specific attributes and actions tailored for photos. An audio folder is intended for storing audio files and may provide the ability to play back audio files and perform audio related actions. A video folder is intended for storing video files and may provide the ability to play video files and perform video related functions. An account may also include shared folders or group folders that are linked with and available to multiple user accounts. The permissions for multiple users may be different for a shared folder.

The content may be stored in content storage 318, which is one means for performing this function. Content storage 318 may be a storage device, multiple storage devices, or a server. Alternatively, content storage 318 may be a cloud storage provider or network storage accessible via one or more communications networks. In one configuration, content management system 100 stores the content items in the same organizational structure as they appear on the client device. However, content management system 100 may store the content items in its own order, arrangement, or hierarchy.

Content storage 318 may also store metadata describing content items, content item types, and the relationship of content items to various accounts, folders, or groups. The metadata for a content item may be stored as part of the content item or may be stored separately. In one configuration, each content item stored in content storage 318 may be assigned a system-wide unique identifier.

Content storage 318 may decrease the amount of storage space required by identifying duplicate files or duplicate segments of files. Instead of storing multiple copies of an identical content item, content storage 318 may store a single copy and then use a pointer or other mechanism to link the duplicates to the single copy. Similarly, content storage 318 may store files using a file version control mechanism that tracks changes to files, different versions of files (such as a diverging version tree), and a change history. The change history may include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100. When the content management system 100 and/or the content storage 318 maintains a first version of a collection of content items and a second version of the collection of content items, the synchronization module 312 may synchronize the second version of the collection of content items to include changes applied to the first version of the collection of content items when an acceptance message is received from the client device 120.

Conflict management module 314 determines whether there are any discrepancies between versions of a content item located at different client devices 120. For example, when a content item is modified at one client device and a second client device, differing versions of the content item may exist at each client device. Synchronization module 312 may determine such versioning conflicts, for example by identifying the modification time of the content item modifications. Conflict management module 314 may resolve the conflict between versions by any suitable means, such as by merging the versions, or by notifying the client device of the later-submitted version.

A user may also view or manipulate content via a web interface generated by user interface module 302. For example, the user may navigate in web browser 260 to a web address provided by content management system 100. Changes or updates to content items in content storage 318 made through the web interface, such as uploading a new version of a file, are synchronized back to other client devices 120 associated with the user's account. Multiple client devices 120 may be associated with a single account and files in the account may be synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an application (App) on a smartphone or tablet computing device, may programmatically make calls directly to content management system 100, when a user provides credentials, to read, write, create, delete, share, or otherwise manipulate content. Similarly, the API may allow users to access all or part of content storage 318 through a web site.

Content management system 100 may also include authenticator module 306, which verifies user credentials, security tokens, API calls, specific client devices, etc., to determine whether access to requested content items is authorized, and is one means for performing this function. Authenticator module 306 may generate one-time use authentication tokens for a user account. Authenticator module 306 assigns an expiration period or date to each authentication token. In addition to sending the authentication tokens to requesting client devices, authenticator module 306 may store generated authentication tokens in authentication token database 320. After receiving a request to validate an authentication token, authenticator module 306 may check authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 may mark the matching authentication token as used or invalid, or delete the matching authentication token from authentication token database 320.

Content management system 100 includes a sharing module 310 for sharing content publicly or privately, which is one means for performing this function. Sharing content publicly may include making the content items accessible from any computing device in network communication with content management system 100. Sharing content privately may include linking a content item in content storage 318 with two or more user accounts so that each user account has access to the content item. The content items may also be shared across varying types of user accounts.

In some embodiments, content management system 100 includes a content management module 308 for maintaining a content directory that identifies the location of each content item in content storage 318, and allows client applications to request access to contents item in the storage 318, and which is one means for performing this function. A content entry in the content directory may also include a content pointer that identifies the location of the content item in content storage 318. For example, the content entry may include a content pointer designating the storage address of the content item in memory. In some embodiments, the content entry includes multiple content pointers that point to multiple locations, each of which contains a portion of the content item.

In addition to a content path and content pointer, a content entry in some configurations may include a user account identifier that identifies the user account that has access to the content item. In some embodiments, multiple user account identifiers may be associated with a single content entry indicating that the content item has shared access by the multiple user accounts.

To share a content item privately, sharing module 310 adds a user account identifier to the content entry associated with the content item, thus granting the added user account access to the content item. Sharing module 310 may also be configured to remove user account identifiers from a content entry to restrict a user account's access to the content item.

To share content publicly, sharing module 310 generates a custom network address, such as a URL, which allows any web browser to access the content in content management system 100 without any authentication. The sharing module 310 includes content identification data in the generated URL, which may later be used by content management system 100 to properly identify and return the requested content item. For example, sharing module 310 may be configured to include the user account identifier and the content path in the generated URL. The content identification data included in the URL may be transmitted to content management system 100 by a client device to access the content item. In addition to generating the URL, sharing module 310 may also be configured to record that a URL to the content item has been created. In some embodiments, the content entry associated with a content item may include a URL flag indicating whether a URL to the content item has been created.

Content Management System

Figure 4A:
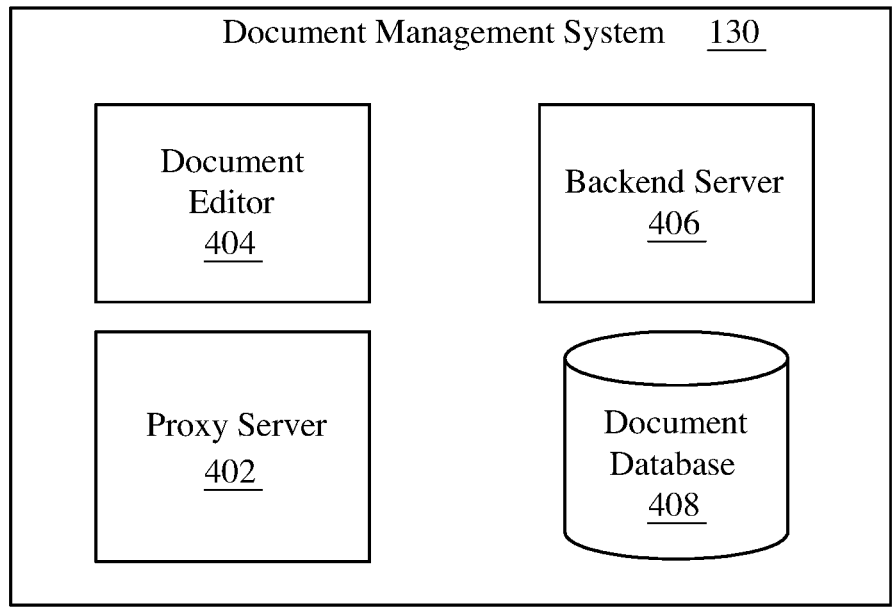
FIG. 4A is a block diagram of the content management system in accordance with an example embodiment.

FIG. 4A shows a block diagram of the content management system 130, according to one embodiment. Like other content items, documents may be shared and synchronized with multiple users and client devices 120, using sharing 310 and synchronization module 312 of content management system 100. Users operate client devices 120 to create and edit content items, and to share content items with other users of client devices 120. Changes to a content item by one client device 120 are propagated to other client devices 120 of users associated with that content item.

In the embodiment of FIG. 1, content management system 130 is shown as separate from content management system 100, and may communicate with the content management system 100 to obtain services associated with the content management system 100. In other embodiments, content management system 130 is a subsystem of the component of content management system 100 that provides sharing and collaboration services for various types of content items. User account database 316 and authentication token database 320 from content management system 100 are used for accessing content management system 130 described herein.

Content management system 130 includes various servers for managing access and edits to content items. Content management system 130 includes proxy server 402, document editor 404, and backend server 406. Proxy server 402 is responsible for handling requests from client applications 200 and passing those requests to document editor 404. Document editor 404 manage application level requests for client applications 200 for editing and creating content items, and selectively interacting with backend servers 406 for processing lower level processing tasks on content items, and interfacing with documents database 408 as needed.

Client application 200 sends a request relating to a content item to proxy server 402. Generally, a request indicates the userID ("UID") of the user, and the content_itemID ("NID") of the content item, and additional contextual information as appropriate, such as the text of the content item. When proxy server 402 receives the request, the proxy server 402 passes the request to the document editor 404. Proxy server 402 also returns a reference to the identified documents server 404 to client application 200, so the client application may directly communicate with the document editor 404 for future requests. In an alternative embodiment, client application 200 initially communicates directly with a specific content item assigned to the userID.

When a document editor 404 receives a request, it determines whether the request may be executed directly or by a backend server 406. When the request adds, edits, or otherwise modifies a content item the request is handled by the document editor 404. If the request is directed to a database or index inquiry, the request is executed by a backend server 406. For example, a request from client device 120 to view a content item or obtain a list of content items responsive to a search term does not modify content items and is processed by backend server 406.

Content management system 100 and content management system 130 may be implemented using a single computer, or a network of computers, including cloud-based computer implementations. For the purposes of this disclosure, a computer is a device having one or more processors, memory, storage devices, and networking resources. The computers are preferably server class computers including one or more high-performance CPUs and 1 G or more of main memory, as well as 500 GB to 2 Tb of computer readable, persistent storage, and running an operating system such as LINUX or variants thereof. The operations of content management system 100 and content management system 130 as described herein may be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, content items servers, failover servers, network management tools and so forth are not shown so as not to obscure the features of the system. Finally, the functions and operations of content management system 100 and content management system 130 are sufficiently complex as to require implementation on a computer system, and may not be performed in the human mind simply by mental steps.

Figure 4B:
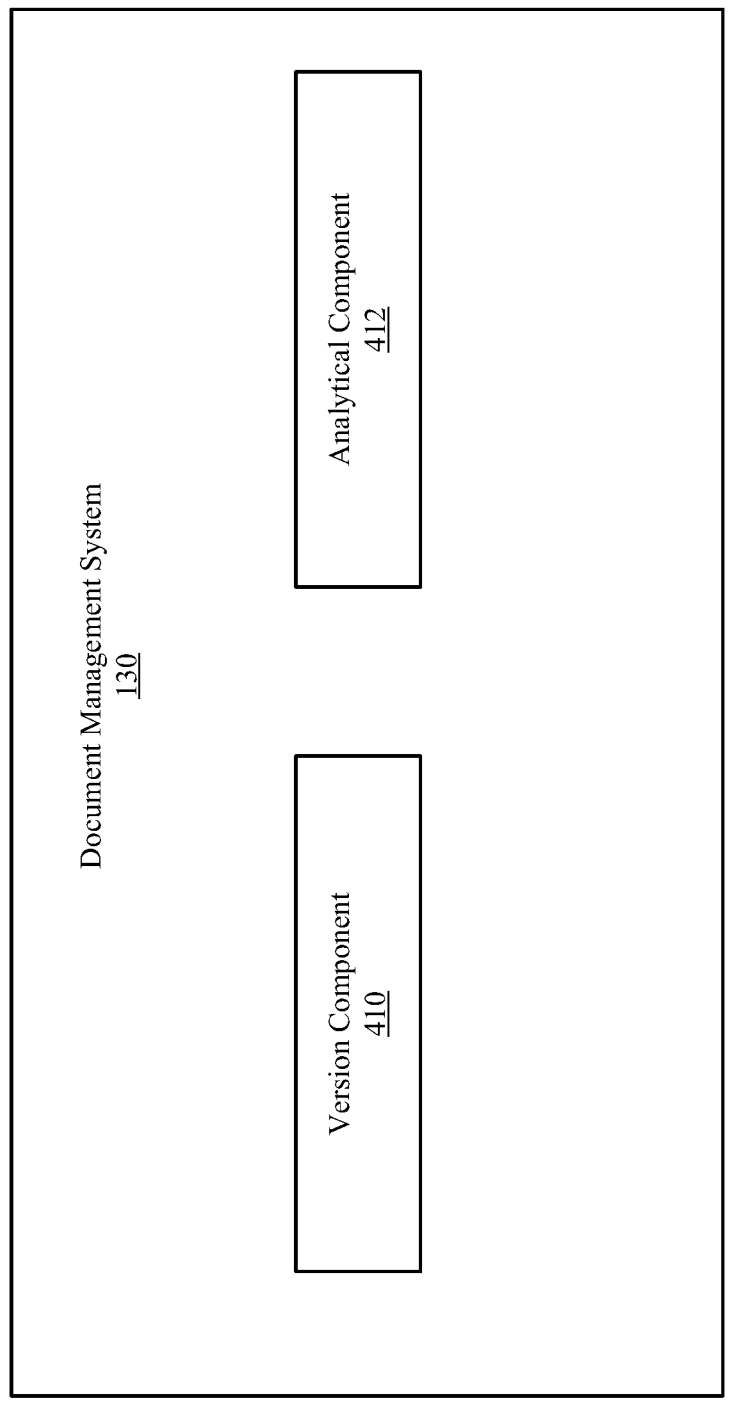
FIG. 4B is a block diagram of the content management system in accordance with an example embodiment.

FIG. 4B shows a block diagram of the content management system 130, according to one embodiment. Like other content management systems, different versions of a collection of content items (e.g., a first version of a collection of content items and a second version of the collection of content items) may be maintained at a versions component 410. Changes to the first version of the collection of content items by one client device 120 may be applied to the second version of the collection of content items when an acceptance message is received from the client device 120. Analytical information associated with various types of interactions with one or more of the first version of the collection of content items and/or the second version of the collection of content items may be maintained at an analytics component 412.

Figure 5:
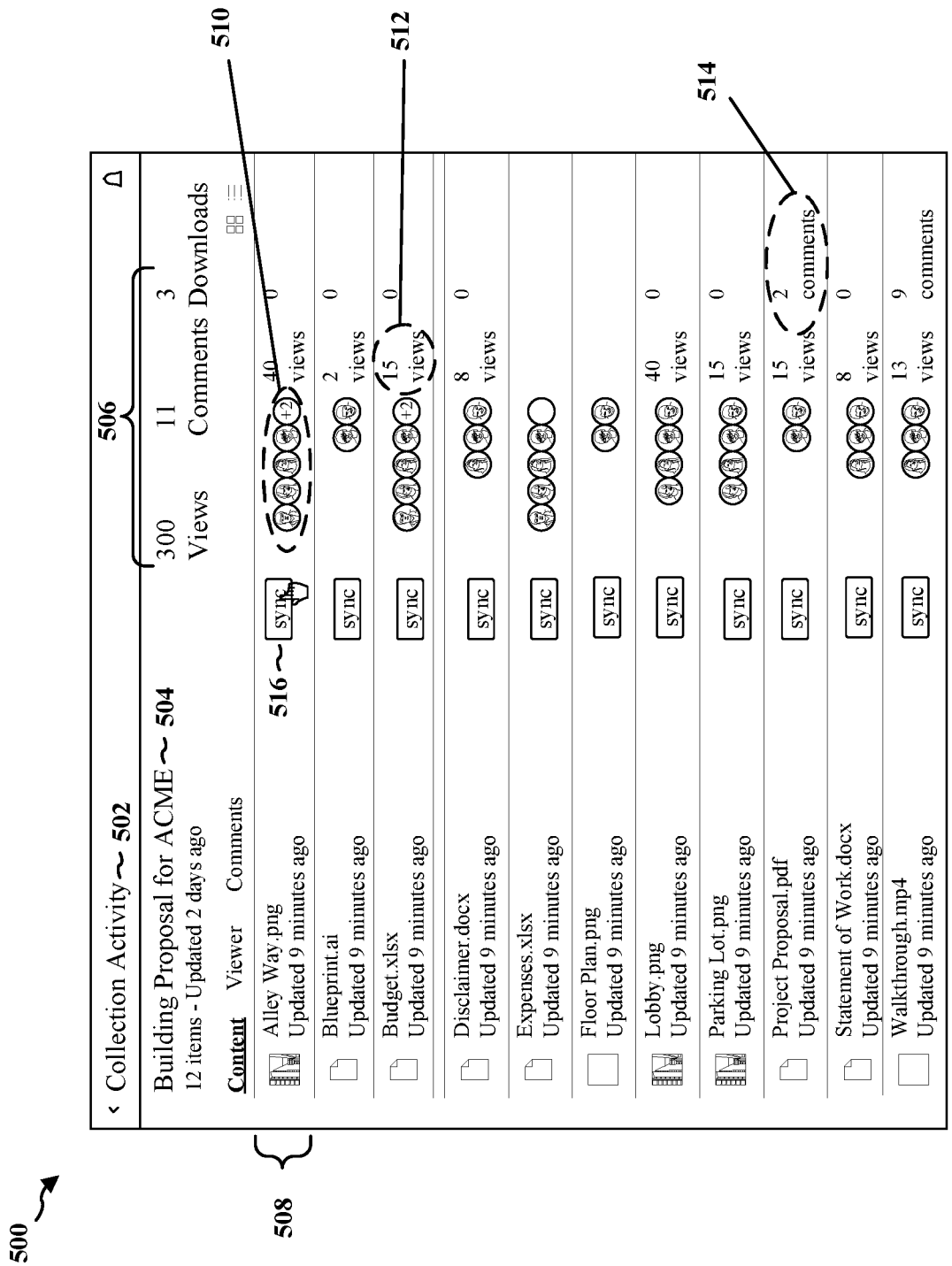
FIG. 5 is an illustration of a user interface rendering a first version of a collection of content items in accordance with an example embodiment.

FIG. 5 illustrates an example of a first version 500 of a collection (e.g., a customizable header, one or more content tiles, and/or documents associated with the collection) of content items maintained by the content management system 130. In one aspect, the first version 500 of the collection of content items may be created by and accessible to the first group of users. In another aspect, the collection of content items illustrated in FIG. 5 may be rendered in a collection activity 502 folder in a user interface on a display 210 of a client device 120. As illustrated in FIG. 5, the first version 500 of the collection of content items may be organized by item 508 in chronological order. For example, each item 508 may be organized in an associated folder. In one aspect, the summation of the analytic information 506 associated with the interactions with the second version of the collection of content items (e.g., see FIG. 6) may be maintained with the first version of 502 of the collection of content items. Analytic information 506 may include, e.g., the number of times the second version of the collection of content items (e.g., see FIG. 6) was viewed by one or more users in the second group of users, the number of comments (e.g., either a total number of comments or the number of comments associated with a particular user) provided by one or more users in the second set of users, the number of times the second version of the collection of content items was downloaded by one or more users in the second group of users, etc. In one configuration, the analytic information for each item 508 in the collection may be maintained with that respective item. For example, a "face pile" 510 (e.g., a thumbnail photo of each user) depicting which users in the second set of users have viewed, interacted with, and/or accessed a particular item may be visible in the folder associated with that item. In one aspect, the number of times a particular item was viewed 512 by one or more users in the second group of users may be visible in the folder associated with that item. In another aspect, the number of comments 514 provided for a content item by one or more users in the second group of users may be visible in the folder associated with that item.

Figure 6:
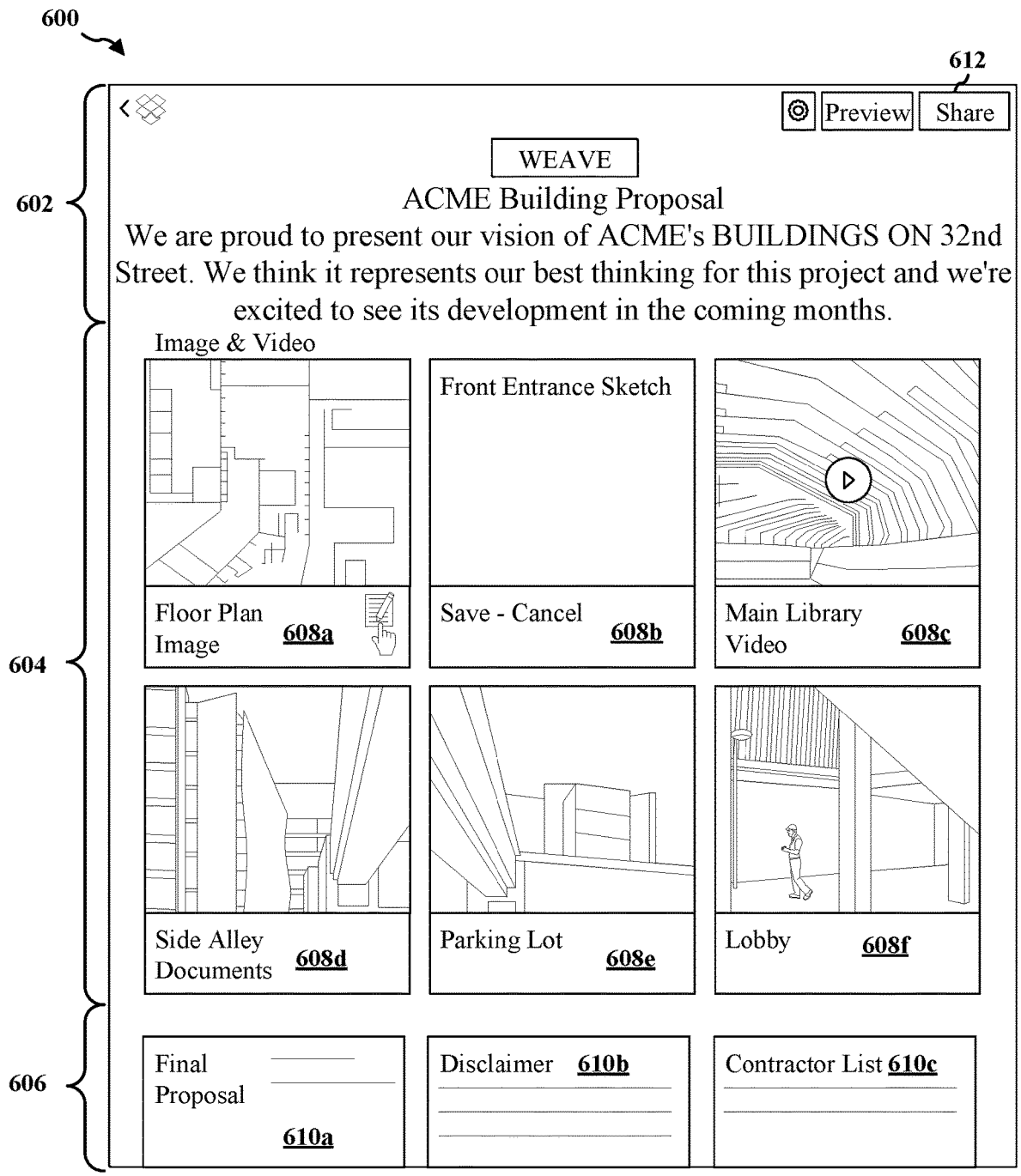
FIG. 6 is an illustration of a user interface rendering a second version of the collection of content items in accordance with an example embodiment.

FIG. 6 illustrates an example of a second version of a collection of content items 700 that is accessible to both the first group of users and the second group of users. For example, FIG. 6 illustrates an example embodiment of the second version of the collection of content items 700 that may be generated by the first group of users in accordance with one or more embodiments. The particular example illustrated in FIG. 6 relates to a collection for an architecture proposal. However, a collection of content items may be directed to any type of proposal and/or work product without departing from the scope of the present application. As seen in FIG. 6, the second version 600 of the collection of content items may include one or more of a customizable header 602, one or more content tiles 604, and/or documents 606 associated with the collection. In one aspect, the first group of users may customize the size and/or location of a content tile 604 within the second version 600 of the collection of content items. In another aspect, the header 602 may include branding and a narrative for the entire collection. In a further aspect, the content tiles 604 may each provide insight into an individual content item, such as a content "preview" (e.g., image related to the content, video icon, audio icon, etc.), and/or additional context such as a title and/or caption.

For example, the content tiles 604 illustrated in FIG. 6 may include a first content tile 608*a* associated with a floor plan for a building and/or architecture proposal, a second content tile 608*b* associated with a sketch of the front entrance of the proposed building, a third content tile 608*c* associated with a main library of the proposed building, a fourth content tile 608*d* associated with a side alley of the proposed building, a fifth content tile 608*e* associated with the parking lot for the proposed building, and a sixth content tile 708*f* associated with the lobby of the proposed building. Although six content tiles are illustrated in FIG. 6, more or fewer than six content tiles may be included in a collection of content items without departing from the scope of the present invention.

Additionally, the documents 606 provided in the second version 600 of the collection of content items may include, e.g., a first document 610*a* associated with the final proposal 610*a* (e.g., description of the proposal, or a more detailed description of each content tile 608*a*, 608*b*, 608*c*, 608*d*, 608*e*, 608*f*), a disclaimer 610*b* from the first group of users, and/or a list of contractors 610*c* that worked on the proposal.

Figure 7:
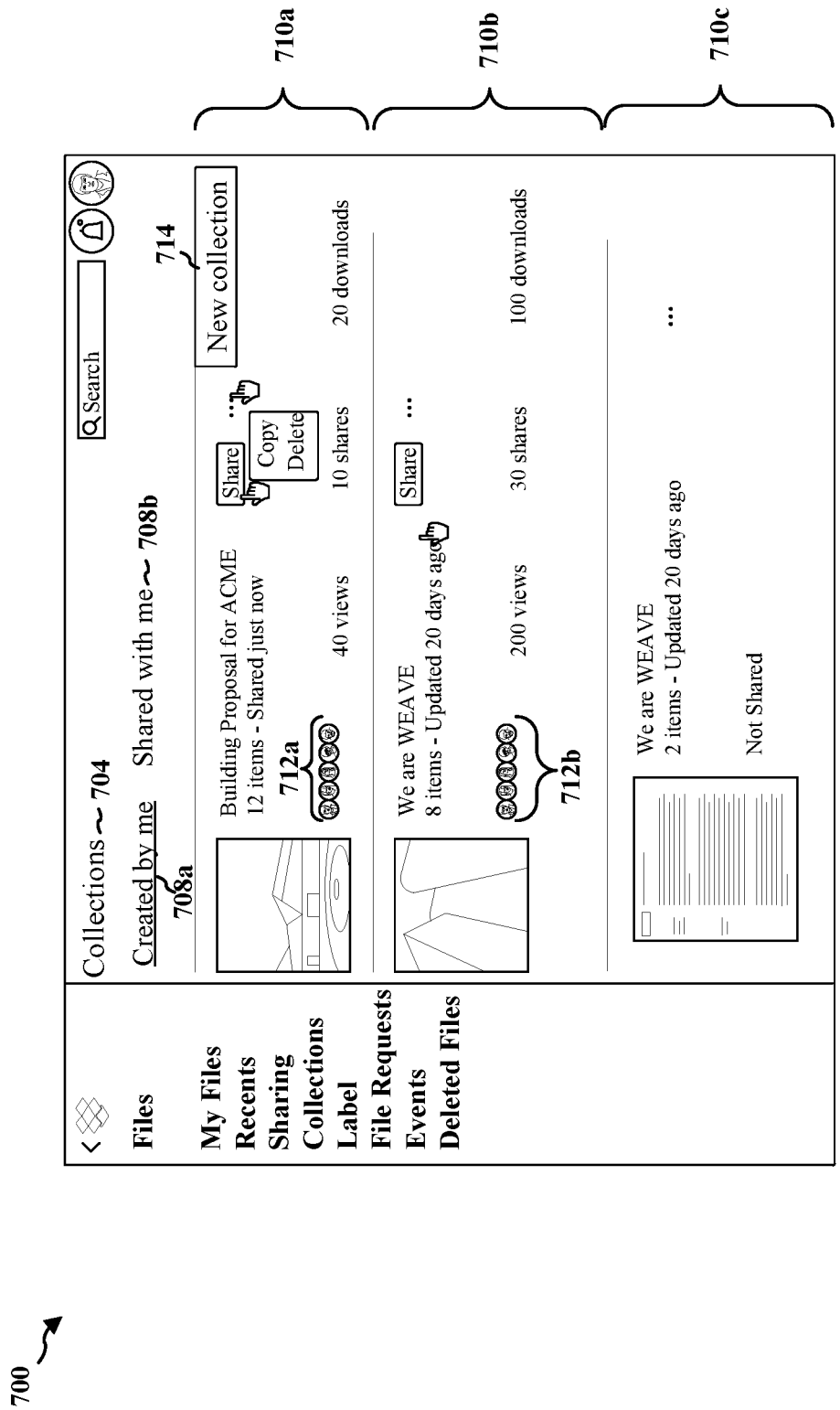
FIG. 7 is an illustration of a user interface rendering a collections folder that includes a plurality of different collections in accordance with an example embodiment.

FIG. 7 illustrates example collections folder 700 that may be maintained by the content management system 130. In one aspect, the collection of content items illustrated in FIG. 7 may be rendered in a user interface on a display 210 of a client device 120 (e.g., associated with a user in the first group of users). When a user has access to one or more collections, the collections 710*a*, 710*b*, 710*c* may be displayed in the collections folder 700 in, e.g., chronological order based on the last collection to be updated (e.g., newest on top). The collections folder 700 may indicate whether a displayed collection 710*a*, 710*b*, 710*c* was created by that user (e.g., "created by me" 708*a*) or if the collection was shared by a different user (e.g., "shared with me" 708*b*). In another aspect, a user in the first group of users may remove content items and/or add additional content items to each collection 710*a*, 710*b*, 710*c* as desired. Further, users in the first group of users may drag-and-drop a file into the collection folder 710*a*, 710*b*, 710*c*, which may upload the file to the directory from which the collection was created, and a collection composer of the content management system 130 may add a new tile to the collection. In some implementations, the same content item may be added to a collection multiple times, e.g., to provide different comment threads 712*a*, 712*b* and/or captions.

FIG. 8 illustrates different pop-up boxes 800, 815, 830 that may be rendered in a user interface on a display 210 of a client device 120 (e.g., associated with a user in the first group of users) when the "Share" icon 612 illustrated in FIG. 6 is selected. For example, a first pop-up box 800 illustrates a list of users that may have certain editing rights associated with the collection. For example, each of the users listed in the first pop-up box 800 may be enabled (e.g., have access rights) to edit the collection. One or more users in the first group of users may be enabled (e.g., have access rights) to share the collection with other internal users (e.g., users in the first group of uses) and/or external users (e.g., users in the second set of users). For example, a user in the first group of users may either click on a user's name from the list (e.g., the list may include information associated with users that the collection will be shared with) in the first pop-up box 800 which will cause the third pop-up box 830 to appear, or manually enter a user's email in the third pop-up box 830, and then share the collection with that user by clicking on a "Share" icon 812 as illustrated in the third pop-up box 830. When the "Share" icon 812 is selected, a signal (e.g., a command or instruction) may be sent to the content management system that triggers the first notification to be sent to the second group of users (e.g., the user accounts and/or devices associated with users in the second group of users).

Additionally and/or alternatively, a second pop-up box 815 may be used when a user in the first group of users wants to share the collection of content items with a new user (e.g., a user that is not associated with either the first group of users or the second group of users at the content management system 130). As illustrated in FIG. 8, the second pop-up box 815 may include collection selection box 802 (e.g., that enables a user to select which collection is being shared), a space for an email address 804, and a selection region 806 for that designates the user as being in either the first group of users (e.g., User 1) and/or the second group of users (e.g., User 2). The collection selection box 802 may enable a user in the first group of users to select a particular collection to share with another user (e.g., either another user in the first group of users and/or a user in the second group of users). In one aspect, the first notification (e.g., email message, pop-up box window, etc.) may be sent to the email account of the user based on the email entered in one of the pop-up boxes 800, 815, 830 discussed supra with respect to FIG. 8. In another aspect, the first notification may include a link 810 to the second version of the collection of content items.

Figure 9A:
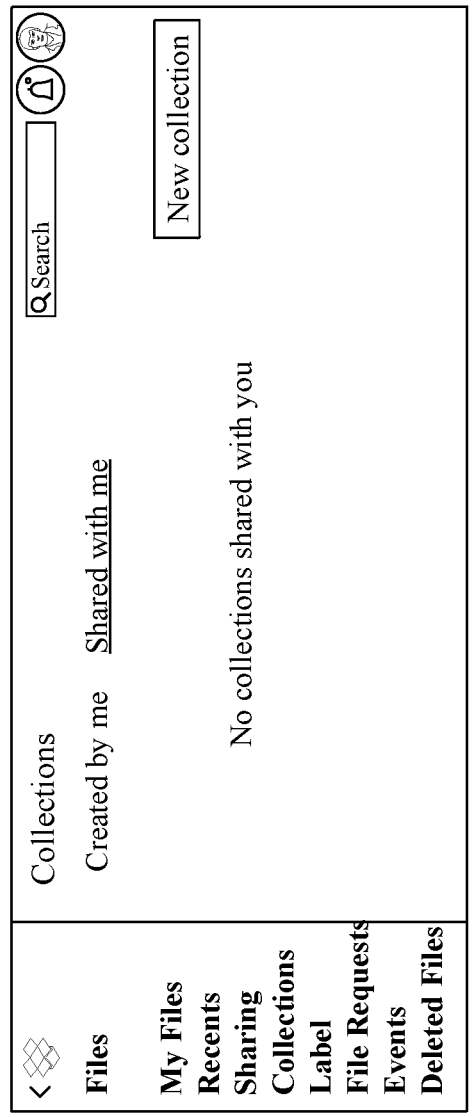
FIG. 9A is an illustration of a user interface rendering a collections folder that does not include a shared collection.

FIG. 9A illustrates an example collections folder 900 that does not include any collection of content items that have been shared. The collections folder 900 that may be rendered in a user interface on a display 210 of a client device 120 (e.g., the second group of users).

Figure 9B:
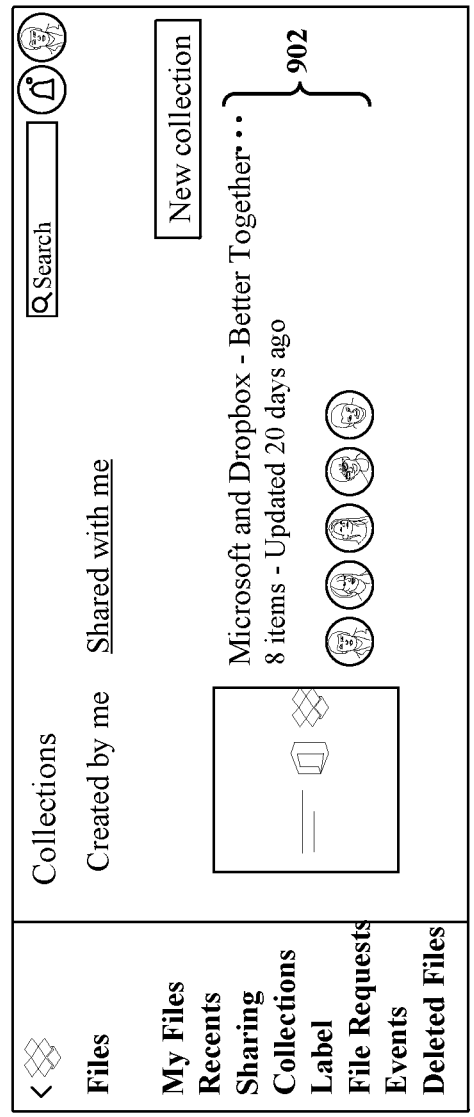
FIG. 9B is an illustration of a collections folder that does include a shared collection in accordance with an example embodiment.

FIG. 9B illustrates an example collections folder 915 that may contain the second version 902 of the collection of content items that may be displayed (e.g., a title for a collection of content items, a number of content items in the collection, when the collection was last updated, thumbnail photos of users in the second group of users, etc.). In one aspect, the collections folders 900, 915 and/or the second version of the collection of content items may be rendered in a user interface on a display 210 of a client device 120 (e.g., the second group of users). Although only one collection of content items is illustrated as being accessible in the collections folder 915 in FIG. 9B, more than one collection of content items may be included in the collections folder 915.

Figure 10A:
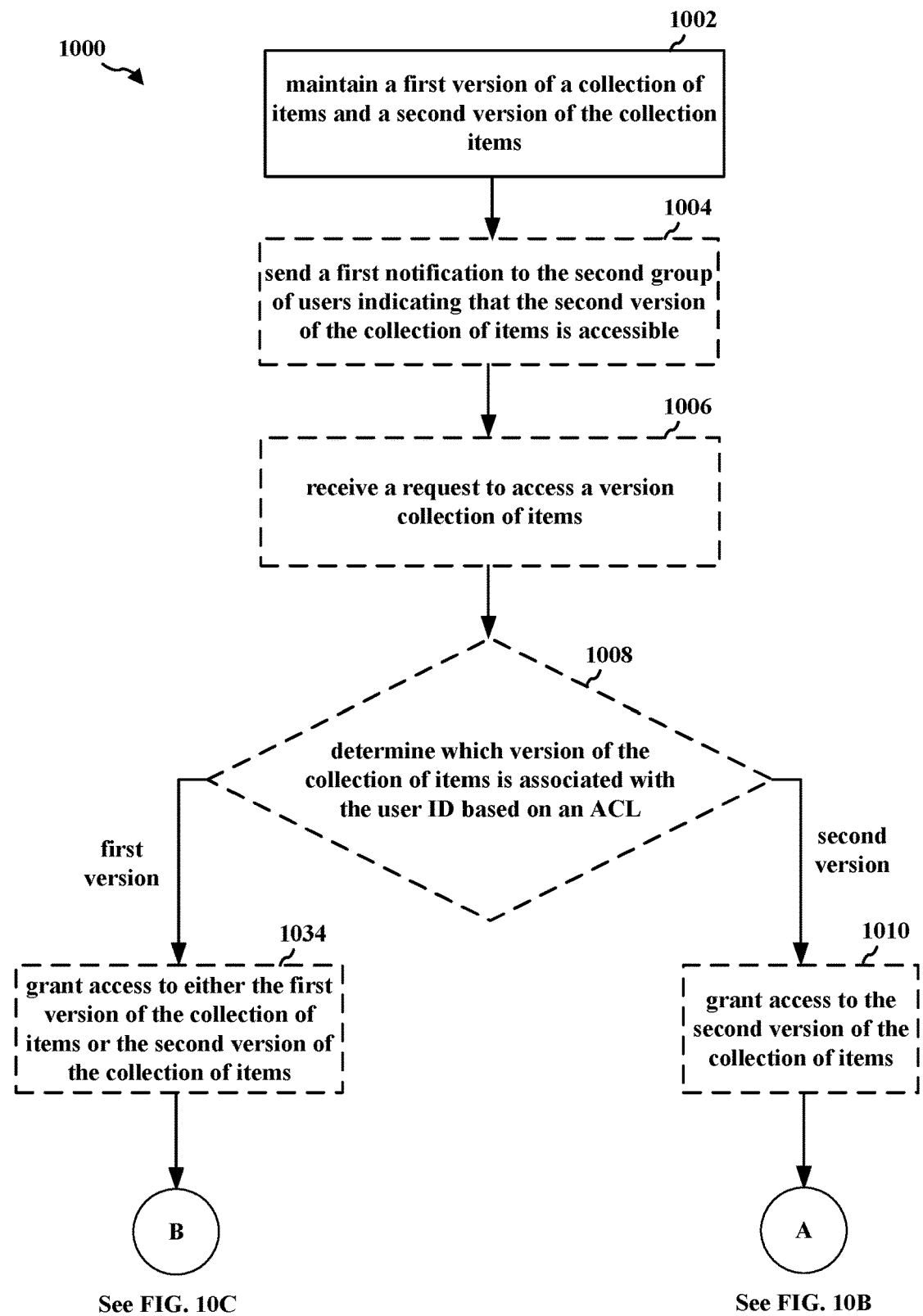
FIGS. 10A, 10B, and 10C are a flowchart for a method of maintaining different versions of a collection of content items in accordance with an example embodiment.
Figure 10B:
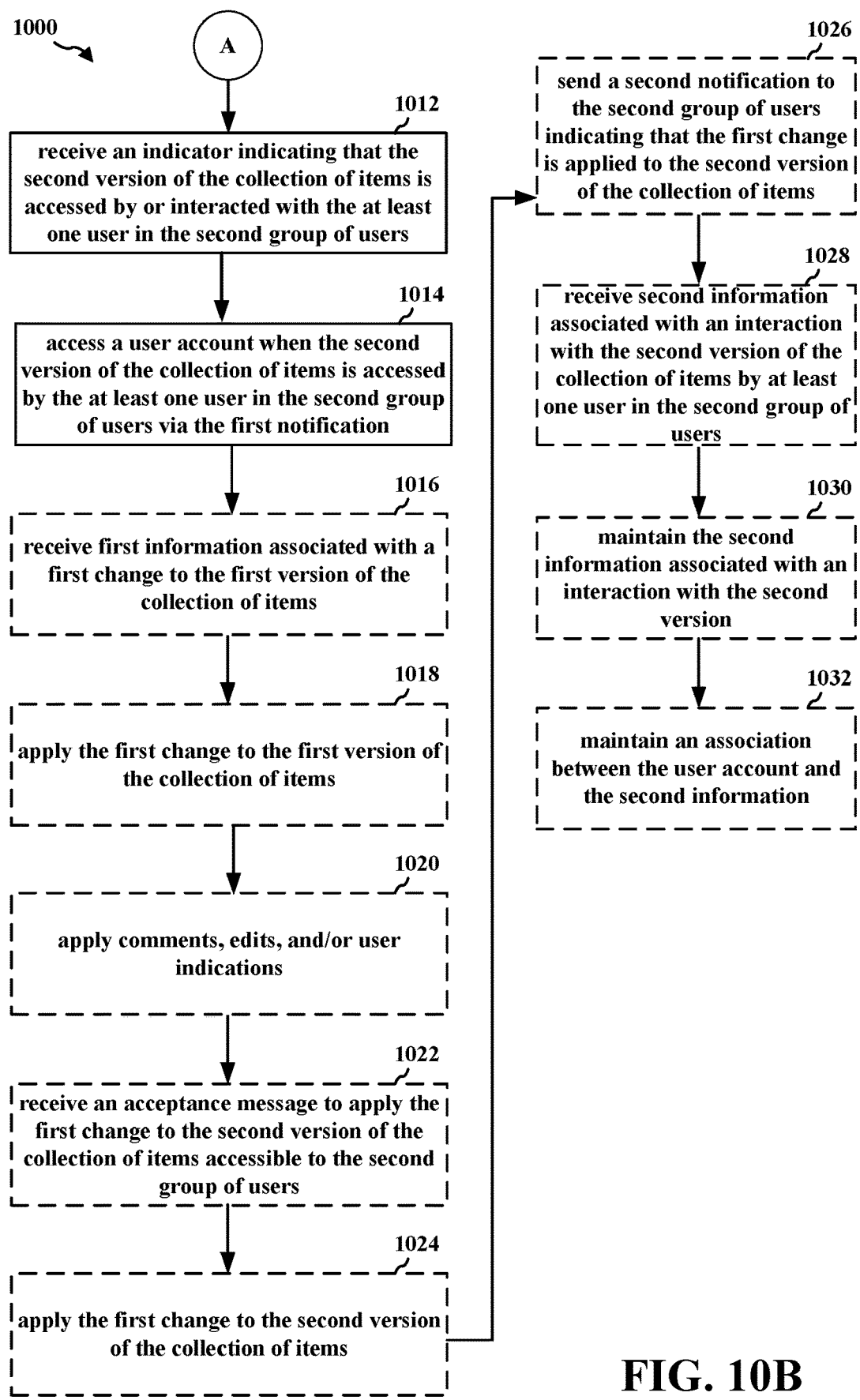
Figure 10C:
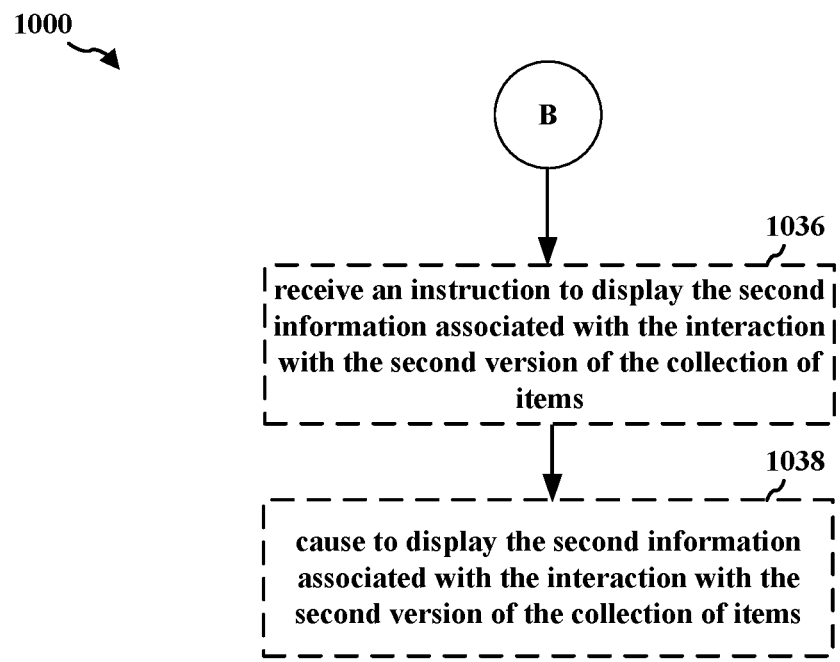

FIGS. 10A, 10B, and 10C illustrate a flowchart for a method 1000 of maintaining different versions of a collection of content items in accordance with certain aspects of the disclosure. Example method 1000 is provided by way of example, as there are a variety of ways to carry out the method. Method 1000 described infra may be carried out using the configurations illustrated in FIGS. 1-4B by way of example, and various elements of these figures are referenced in explaining example method 1000. For example, the method 1000 may be performed by a content management system (e.g., content management system 100, data management system 130, user account database 316, content storage 318, etc.) in communication with a first group of users (e.g., a processor 208, web browser 260, document editor 270, document editor 404, and/or the client application 200 of a client device 120 of a user in the first group of users) and a second group of users (e.g., a processor 208, web browser 260, document editor 270, document editor 404, and/or the client application 200 of a client device 120 associated with a user in the second group of users). Each block shown in FIGS. 10A, 10B, and 10C represents one or more processes, methods or subroutines, carried out in exemplary method 1000. In FIGS. 10A, 10B, and 10C, optional operations are indicated with dashed lines. Exemplary method 1000 may begin at block 1002.

Referring to FIG. 10A, at block 1002, maintain a first version of a collection of content items and a second version of the collection of content items. In one aspect, both versions of the collection may be maintained by the user account database 316, content storage 318, and/or the versions component 410. In another aspect, the first version of the collection of content items and the second version of the collection of content items may be accessible to the first group of users (e.g., internal users and/or service provider). In another aspect, the second version of the collection of content items may be accessible to the second group of users (e.g., external users and/or client of the service provider), and the first group of users may be a subset of the second group of users.

At block 1004, send a first notification to the second group of users indicating that the second version of the collection of content items is accessible to the second group of users. For example, a sharing module 310 of the content management system 100 may share the second version of the collection of content items with the second group of users by sending the first notification (e.g., email message, pop-up box window, etc.) in response to a user in the first group sharing the second version of the content items with the second group of users. In one aspect, the content management system 130 may send the first notification when a signal (e.g., command, instruction, etc.) is received from the first group of users. For example, when a user in the first group of users selects the "Share" icon 612 illustrated in FIG. 6, one of the different pop-up boxes 800, 815, 830 illustrated in FIG. 8 may be rendered in a user interface on a display 210 of a client device 120, and a user in the first group of users my select "send" in order to the sends the first notification to the second group of users.

At block 1006, receive a request to access a version of the collection of content items. In one aspect, the request may include a user ID. For example, the user account data base 316 may receive a request to access a version of the collection of content items. A user in the first group of users and/or the second group of users may be associated with a particular version of the collection of content items by storing the information linking the userID and the content_itemID (e.g., the first version and the second version have a different content_itemID) in a table, file, or other storage formats. A user in the first group of users may be able to access the second version of the collection of content items by selecting a folder associated with the second version, and a user in the second group may able to access the second version of the collection of items but not the first version of the collection of items.

At block 1008, determine which version of the collection of content items is associated with the user ID based on an ACL. For example, the user account data base 316 and/or versions component 410 may receive a request to access a version of the collection of content items. A user in the first group of users and/or the second group of users may be associated with a particular version of the collection of content items by storing the information linking the userID and the content_itemID (e.g., the first version and the second version have a different content_itemID) in a table, file, or other storage formats. In one configuration, a database table (e.g., ACL) organized by content_itemIDs may include a column listing the userID of each user associated with a particular version of the collection of content items. For example, a user in the second group of users may obtain a link to the first version of the collection of content items and attempts to access the first version. Because the user's account has been accessed, the content management database 100 and/or the document management database 130 may be able to determine that the user is not associated with the first version based on a determination made using the userID (e.g., associated with the user's account) and the ACL. Consequently, the user in the second group of users may be restricted to accessing the second version of the collection, and not the first version of the collection of content items. For example, a user in the first group may receive a link to the first version of the collection of items that provides access to both the first version of the collection of items and the second version of the collection of items, and a user in the second group may receive a link to the second version of the collection of items that provides access to the second version of the collection of items and not the first version of the collection of items. When it is determined (at 1008) that the second version of the collection of items is associated with the user ID based on the ACL the operation may move to block 1010. Alternatively, when it is determined (at 1008) that the first version of the collection of items is associated with the user ID based on the ACL the operation may move to block 1036.

At block 1010, grant access to the second version of the collection of content items in response to the determination (at 1008) that the second version of the collection of items is associated with the user ID based on the ACL. For example, the user account data base 316 and/or versions component 410 may receive a request to access the second version of the collection of content items.

Referring to FIG. 10B, at block 1012, receive an indicator indicating that the second version of the collection of content items is accessed by the at least one user in the second group of users. For example, the indicator may be received by content management system 100 and/or the content management system 130 from a client device 120 (e.g., associated with a user in the second group of users). In one aspect, the indicator may indicate an amount of time (e.g., how much of a video file was played, how long did a user interact with different tiles, etc.) that at least one content item associated with the second version of the collection of content items is accessed by the at least one user in the second group of users or is interacted with by the at least one user in the second group of users. A clock may be used to determine an amount of time that the at least one item associated with the second version of content items was accessed, and the time may be included in the indicator as metadata. Using the metadata, the content management system 100 and/or the content management system 130 may determine the amount of time that the at least one content item was accessed. In another aspect, the amount of time includes a length of time a video file is accessed by the at least one user in the second group of users.

At block 1014, access a user account associated with the content management system and maintain information associated with the user's interactions with the second version of the collection of items. In certain configurations, information associated the user's interactions may be stored in the accessed user account when the second version of the collection of content items is accessed by a user in the second group of users. For example, when the indicator is received, the content management system 100 and/or the content management system 130 may access user account database 316, and maintain information associated with the user's interactions with the second version of the collection of content items in the user's account.

At block 1016, receive first information associated with a first change to the first version of the collection of content items. For example, the first information associated with the first change may be received by the proxy server 402, document editor 404, and/or backend server 406 from client device 120 (e.g., associated with a user in the first group of users). In addition, the first information may indicate a change to one or more comments or edits, and/or an indication of one or more users associated with each of the one or more comments or edits. Referring to FIG. 5, a user in the first group of users may make a change to one or more of the content items 508 in the first version of the collection of content items. For example, the change may be associated with one or more of an image, a text portion of an item 508, an addition or deletion of a video file, the inclusion of a comment for another user in the first group of users, a response to a comment from another user in the first group of users, etc. The user in the first group of users may make a change to the first version of the collection being displayed on a user interface of the client device 120.

At block 1018, apply the first change to the first version of the collection of content items. For example, when proxy server 402 receives the first information, the proxy server 402 passes the request to the document editor 404. When a document editor 404 receives the first information, the document editor 404 may determine whether the request may be executed directly or by a backend server 406. Referring to FIG. 5, the proxy server 402 and/or document editor 404 may apply the change to one or more of the content items 508 in the first version of the collection of content items. For example, the change may be applied to one or more of an image, a text portion of the item 508, an addition or deletion of a video file, the inclusion of a comment for another user in the first group of users, a response to a comment from another user in the first group of users, etc.

At block 1020, apply the one or more comments and the indication of the one or more users to the first version of the collection of content items. In one aspect, the one or more comments and the indication of the one or more individuals each associated with the one or more comments may not be maintained in the second version of the collection of content items. For example, when proxy server 402 receives the first information, the proxy server 402 may pass the request to the document editor 404. When a document editor 404 receives the first information, the document editor 404 may apply the one or more comments and the indication of the one or more users to the first version of the collection of content items. Referring to FIG. 5, the proxy server 402 and/or document editor 404 may apply the change to one or more of the content items 508 in the first version of the collection of content items. For example, the comment that is applied to the first version of the collection of items may include a comment for another user in the first group of users, a response to a comment from another user in the first group of users, an avatar associated with a particular user that has made a change to the collection may be included in the "face pile" 510, etc.

At block 1022, receive an acceptance message to apply the first change to the second version of the collection of content items accessible to the second group of users. For example, the acceptance message may be received by the proxy server 402, the document editor 404, and/or the synchronization module 312. The acceptance message may be received from a client device 120 (e.g., associated with a user in the first group of users), when the first change is approved for inclusion in the second version of the collection of content items. For example, referring to FIG. 5, the acceptance message may be received when a user in the first group of users selects the "sync" icon 516 associated with a particular item 508.

At block 1024, apply the first change to the second version of the collection of content items. For example, when proxy server 402 receives the acceptance message, the proxy server 402 passes the acceptance message to the document editor 404. When a document editor 404 receives the acceptance message, the document editor 404 may determine whether the first change may be applied to the second version of the collection of content items. Referring to FIG. 6, the proxy server 402 and/or document editor 404 may apply the change made to the first version of the collection to the second version of the collection of content items. For example, the change may be applied to one or more of the customizable header 602, one or more content tiles 604, and/or documents 606 associated with the second version of the collection of content items 600. In one aspect, the change may be applied to one or more of an image, a text portion of an item 608, an addition or deletion of a video file, a response (e.g., from a user in the first set of users) to a comment provided by a user in the second group of user, etc.

At block 1026, send a second notification to the second group of users indicating that the first change is applied to the second version of the collection of content items. For example, a sharing module 310 of the content management system 100 may share the revised second version of the collection of content items with the second group of users by sending the second notification (e.g., email message, pop-up box window, etc.). In one aspect, the content management system 130 may send the second notification when a signal (e.g., command, instruction, etc.) is received from the first group of users. For example, referring to FIG. 5, when a user in the first group of users selects the "sync" icon associated with a particular item 508, the change to that item may be applied to the second version of the collection of content items, and the content management system 130 may send the second notification to the second group of users.

At block 1028, receive second information associated with an interaction with the second version of the collection of content items by at least one user in the second group of users. In one aspect, the second information may be received and/or determined by analytics component 412. For example, referring to FIG. 5, analytic information 506 (e.g., the second information) associated with the entire collection of content items may be received when a user in the second group of users interacts or accesses a particular item (e.g., see 602, 604, 606, 608a, 608b, 608c, 608d, 608e, 608f, 610a, 610b, 610c in FIG. 6) in the second version 600 of the collection of content items. Analytic information 506 may include, e.g., the number of times the second version of the collection of content items (e.g., see FIG. 6) was viewed by one or more users in the second group of users, the number of comments level by one or more users in the second set of users, the number of times the second version of the collection of content items was downloaded by one or more users in the second group of users, etc. In one configuration, the analytic information for each item 508 in the collection may be maintained with that particular item. For example, a "face pile" 510 depicting which users in the second set of users have viewed, interacted with, and/or accessed a particular item may be visible in the folder associated with that item 608. Further, the number of times a particular item was viewed 512 by one or more users in the second group of users may be visible in the folder associated with that item 508. In addition, the number of comments 514 provided for an item by one or more users in the second group of users may be visible in the folder associated with that item 508.

At block 1030, maintain the second information associated with the interaction with the second version of the collection of content items. In one aspect, second information (e.g., analytic information) may be maintained with the first version of the collection of content items by the user account database 316, content storage 318, versions component 410, and/or analytics component 412. For example, referring to FIG. 5, analytic information 506 (e.g., the second information) associated with a user's interaction (e.g., a user in the second group of users) with one or more content items in the collection may be maintained with the first version 500 of the collection of content items. At block 1032, maintain an association between the user account and the second information. In one aspect, second information (e.g., analytic information) may be maintained with a particular user account by the user account database 316, content storage 318, and/or analytics component. For example, referring to FIG. 5, analytic information 506 may include, e.g., the number of times the second version of the collection of content items (e.g., see FIG. 6) was viewed by one or more users in the second group of users, the number of comments level by one or more users in the second set of users, the number of times the second version of the collection of content items was downloaded by one or more users in the second group of users, etc. The analytic information 606 illustrated in FIG. 5 may also be maintained with a user's account.

At block 1032, maintain an association between the user account and the second information. In one aspect, second information (e.g., analytic information) may be maintained with a particular user account by the user account database 316, content storage 318, and/or analytics component. For example, referring to FIG. 5, analytic information 506 may include, e.g., the number of times the second version of the collection of content items (e.g., see FIG. 6) was viewed by one or more users in the second group of users, the number of comments level by one or more users in the second set of users, the number of times the second version of the collection of content items was downloaded by one or more users in the second group of users, etc. The analytic information 606 illustrated in FIG. 5 may also be maintained with a user's account.

Returning to FIG. 10A, at block 1034, grant access to the first version of the collection of content items when it is determined (at 1008) that the first version of the collection of items is associated with the user ID based on the ACL. For example, the user account data base 316 and/or versions component 410 may receive a request to access a version of the collection of content items. A user in the first group of users may be associated with a particular version of the collection of content items by storing the information linking the userID and the content_itemID (e.g., the first version and the second version have a different content_itemID) in a table, file, or other storage formats. In one configuration, a database table (e.g., ACL) organized by content_itemIDs may include a column listing the userID of each user associated with a particular version of the collection of content items. A user in the first group of users may be able to access the first version or the second version of the collection of content items when the first version of the collection of items is accessed. For example, when the first collection of items (e.g., or a folder maintaining the first collection of items) is display the second collection of items (e.g., or a folder maintaining the second collection of item) may also be displayed and accessible by the user in the first group of users.

Referring to FIG. 10C, at block 1036, receive an instruction to display the second information associated with the interaction with the first version of the collection of content items. For example, referring to FIG. 5, analytic information 506 (e.g., the second information) may optionally be displayed on the first version 500 of the collection of content items. Analytic information 506 may include, e.g., the number of times the second version of the collection of content items (e.g., see FIG. 6) was viewed by one or more users in the second group of users, the number of comments level by one or more users in the second set of users, the number of times the second version of the collection of content items was downloaded by one or more users in the second group of users, etc. In one configuration, the analytic information for each item in the collection may be maintained with that particular item 508 in the first version 500 in the collection of content items. For example, a "face pile" 510 depicting which users in the second set of users have viewed, interacted with, and/or accessed a particular item may be visible in the folder associated with that item 508. Further, the number of times a particular item was viewed 512 by one or more users in the second group of users may be visible in the folder associated with that item 608. In addition, the number of comments 514 provided for an item by one or more users in the second group of users may be visible in the folder associated with that content item 508. In certain configurations, the content management system 100 and/or the content management system 130 may receive the instruction from a processor 208, web browser 260, document editor 270, document editor 404, and/or client application 200 of the client device 120 (e.g., a device associated with a user in the first group of users).

At 1038, cause to display the second information associated with the interaction with the second version of the collection of content items. For example, the content management system 100 and/or the content management system 130 may cause analytic information gathered from the second version of the collection of content items to be displayed on the first version in a processor 208, web browser 260, document editor 270, document editor 404, and/or client application 200 of the client device 120 (e.g., a device associated with a user in the first group of users). For example, referring to FIG. 5, analytic information 506 (e.g., the second information) may optionally be displayed on the first version 500 of the collection of content items. Analytic information 506 may include, e.g., the number of times the second version of the collection of content items (e.g., see FIG. 6) was viewed by one or more users in the second group of users, the number of comments level by one or more users in the second set of users, the number of times the second version of the collection of content items was downloaded by one or more users in the second group of users, etc. In one configuration, the analytic information for each item in the collection may be maintained with that particular item 508 in the first version 500 in the collection of content items. For example, a "face pile" 510 depicting which users in the second set of users have viewed, interacted with, and/or accessed a particular item may be visible in the folder associated with that item 508. Further, the number of times a particular item was viewed 512 by one or more users in the second group of users may be visible in the folder associated with that item 508. In addition, the number of comments 514 provided for an item by one or more users in the second group of users may be visible in the folder associated with that item 508.

Figure 11A:
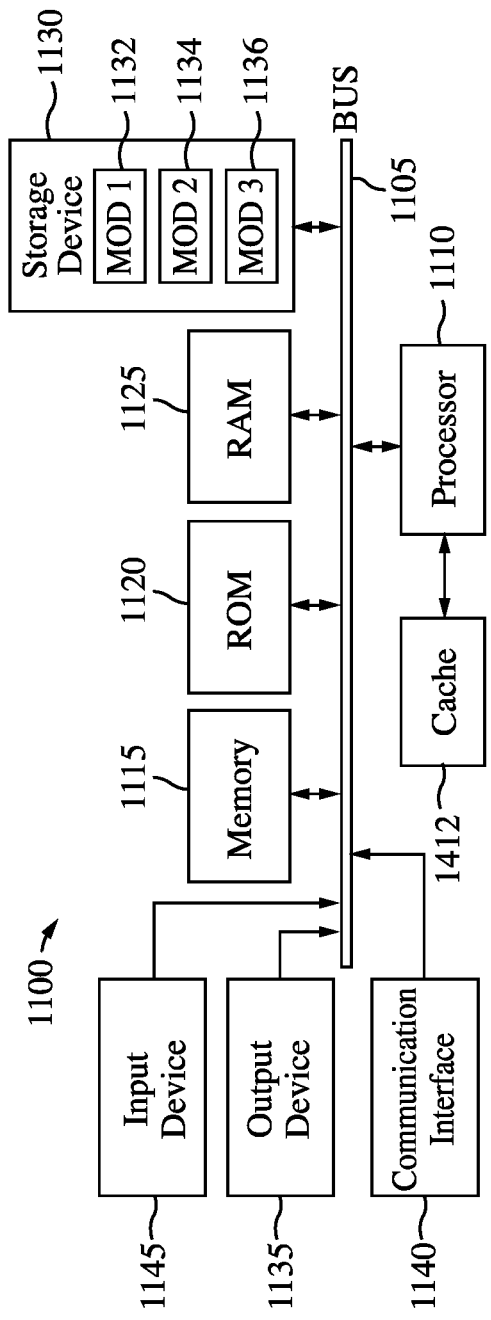
FIG. 11A is a block diagram of a system for implementing various embodiments of the present technology in accordance with an example embodiment.
Figure 11B:
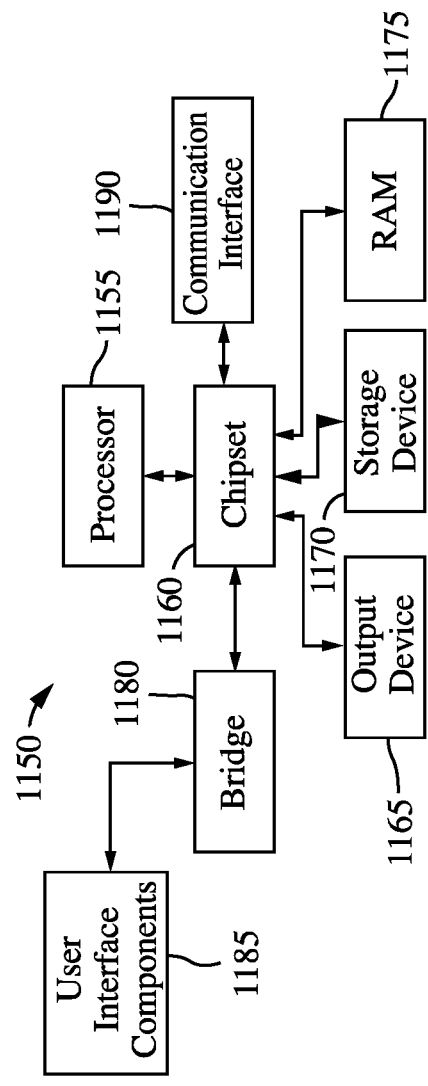
FIG. 11B is a block diagram of a system for implementing various embodiments of the present technology in accordance with an alternative example embodiment.

FIGS. 11A and 11B show exemplary possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 may include a cache of high-speed memory connected directly with, in close proximity to, or integrated as part of the processor 1110. The system 1100 may copy data from the memory 1115 and/or the storage device 1130 to the cache 1112 for quick access by the processor 1110. In this way, the cache may provide a performance boost that avoids processor 1110 delays while waiting for data. These and other modules may control or be configured to control the processor 1110 to perform various actions. Other system memory 1115 may be available for use as well. The memory 1115 may include multiple different types of memory with different performance characteristics. The processor 1110 may include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 may represent any number of input mechanisms, such as a microphone for speech, a touch-sensitive screen for gesture or graphical input, keyboard, mouse, motion input, speech and so forth. An output device 1135 may also be one or more of a number of output mechanisms known to those types of input to communicate with the computing device 1100. The communications interface 1140 may generally govern and manage the user input and system output. There is no restriction on operating on any particular hardware arrangement and therefore the basic features here may easily be substituted for improved hardware or firmware arrangements as they are developed.

Storage device 1130 is a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 may include software modules 1132, 1134, 1136 for controlling the processor 1110. Other hardware or software modules are contemplated. The storage device 1130 may be connected to the system bus 1105. In one aspect, a hardware module that performs a particular function may include the software component stored in a computer-readable medium in connection with the necessary hardware components, such as the processor 1110, bus 1105, display 1135, and so forth, to carry out the function.

FIG. 11B illustrates a computer system 1150 having a chipset architecture that may be used in executing the described method and generating and displaying a graphical user interface (GUI). Computer system 1150 is an example of computer hardware, software, and firmware that may be used to implement the disclosed technology. System 1150 may include a processor 1155, representative of any number of physically and/or logically distinct resources capable of executing software, firmware, and hardware configured to perform identified computations. Processor 1155 may communicate with a chipset 1160 that may control input to and output from processor 1155. In this example, chipset 1160 outputs information to output 1165, such as a display, and may read and write information to storage device 1170, which may include magnetic media, and solid state media, for example. Chipset 1160 may also read data from and write data to RAM 1175. A bridge 1180 for interfacing with a variety of user interface components 1185 may be provided for interfacing with chipset 1160. Such user interface components 1185 may include a keyboard, a microphone, touch detection and processing circuitry, a pointing device, such as a mouse, and so on. In general, inputs to system 1150 may come from any of a variety of sources, machine generated and/or human generated.

Chipset 1160 may also interface with one or more communication interfaces 1190 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1155 analyzing data stored in storage 1170 or 1175. Further, the machine may receive inputs from a user via user interface components 1185 and execute appropriate functions, such as browsing functions by interpreting these inputs using processor 1155.

It may be appreciated that exemplary systems 1100 and 1150 may have more than one processor 1110 or be part of a group or cluster of computing devices networked together to provide greater processing capability.

Any of the steps, operations, functions, or processes described herein may be performed or implemented by a combination of hardware and software modules, alone or in combination with other devices. In an embodiment, a software module may be software that resides in memory of a client device and/or one or more servers of a content management system and perform one or more functions when a processor executes the software associated with the module. The memory may be a non-transitory computer-readable medium.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module may be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module may be incorporated into a single module. Where the modules described herein are implemented as software, the module may be implemented as a standalone program, but may also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details may be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of communications for a content management system, the method comprising:
    maintaining a first version of a collection of content items and a second version of the collection of content items, the first version of the collection of content items and the second version of the collection of content items being accessible to a first group of users, the second version of the collection of content items being accessible to a second group of users, and the first group of users being a subset of the second group of users;
    receiving first information associated with a first change to the first version of the collection of content items;
    storing, by the content management system, the first change in a change history associated with the first version of a collection of content items, the change history comprises a set of changes associated with the first version of the collection of content items;
    applying the first change to the first version of the collection of content items accessible to the first group of users, the first change to the first version of the collection of content items being displayed as a marked version of the collection of content items, wherein the second version of the collection of content items does not include the first change;
    receiving, by the content management system, an acceptance message instructing the content management system to apply the first change to the second version of the collection of content items; and
    upon receiving the acceptance message, applying, by the content management system, the first change to the second version of the collection of content items.

2. The computer-implemented method of claim 1, wherein the first information includes one or more comments or edits and an indication of one or more users associated with each of the one or more comments or edits, wherein the applying the first change to the first version of the collection of content items comprises:
    applying the one or more comments or edits and the indication of the one or more users to the first version of the collection of content items.

3. The computer-implemented method of claim 2, wherein the one or more comments and the indication are not maintained in the second version of the collection of content items.

4. The computer-implemented method of claim 1, further comprising:
    receiving the acceptance message to apply the first change to the second version of the collection of content items accessible to the second group of users, wherein the maintaining the second version of the collection of content items comprises:
    applying the first change to the second version of the collection of content items, the first change being indicated in the second version of the collection of content items.

5. The computer-implemented method of claim 4, further comprising:
    sending a notification to the second group of users indicating that the first change is applied to the second version of the collection of content items.

6. The computer-implemented method of claim 1, further comprising:
receiving second information associated with an interaction with the second version of the collection of content items by at least one user in the second group of users, the interaction being associated with at least one content item of the collection of content items, and the at least one user in the second group of users not being included in the first group of users.

7. The computer-implemented method of claim 6, wherein the maintaining the first version of the collection of content items for the content management system comprises:
maintaining the second information associated with the interaction with the second version of the collection of content items with the at least one content item of the collection of content items.

8. The computer-implemented method of claim 7, further comprising:
receiving, at the content management system, an instruction to display the second information associated with the interaction with the second version of the collection of content items; and
causing a display of the second information associated with the interaction with the second version of the collection of content items, the second information being displayed on the first version of the collection of content items.

9. The computer-implemented method of claim 6, further comprising:
receiving, at the content management system, a notification indicating that the second version of the collection of content items is accessed by the at least one user in the second group of users or is interacted with by the at least one user in the second group of users.

10. The computer-implemented method of claim 9, wherein the notification indicates an amount of time that the at least one content item associated with the collection of content items is accessed by the at least one user in the second group of users or is interacted with by the at least one user in the second group of users.

11. The computer-implemented method of claim 10, wherein the amount of time includes a length of time a video file is accessed by the at least one user in the second group of users.

12. The computer-implemented method of claim 6, further comprising:
sending a first notification to the second group of users indicating that the second version of the collection of content items is accessible.

13. The computer-implemented method of claim 12, further comprising:
accessing a user account associated with the content management system when the second version of the collection of content items is accessed by the at least one user in the second group of users via the first notification; and
maintaining an association between the user account and the second information.

14. The computer-implemented method of claim 1, further comprising:
receiving a request to access the collection of content items, the request including a user identification (ID);
determining which version of the collection of content items is associated with the user ID based on an access control list; and
granting access to either the first version of the collection of content items or the second version of the collection of content items based on the determination.

15. A system comprising:
one or more processors; and
a computer-readable storage medium having processor-executable instructions stored therein for causing the one or more processors to:
maintain, at a content management system, a first version of a collection of content items and a second version of the collection of content items, the first version of the collection of content items and the second version of the collection of content items being accessible to a first group of users, the second version of the collection of content items being accessible to a second group of users, and the first group of users being a subset of the second group of users;
receive first information associated with a first change to at least one item of the first version of the collection of content items
store the first change in a change history associated with the first version of a collection of content items, the change history comprises a set of changes associated with the first version of the collection of content items;
apply the first change to the first version of the collection of content items accessible to the first group of users, the first change to the first version of the collection of content items being displayed as a marked version of the collection of content items, wherein the second version of the collection of content items does not include the first change;
receive an acceptance message instructing the content management system to apply the first change to the second version of the collection of content items; and
based on the acceptance message, apply synchronize the first change applied to the first version of the collection of content items to the second version of the collection of content items.

16. The system of claim 15, wherein the first information includes one or more comments and an indication of one or more individuals associated with each of the one or more comments, wherein the one or more processors are configured to apply the first change to the first version of the collection of content items by:
applying the one or more comments and the indication of the one or more individuals each associated with the one or more comments to the first version of the collection of content items.

17. The system of claim 16, wherein the one or more comments and the indication of the one or more individuals each associated with the one or more comments are not maintained in the second version of the collection of content items.

18. The system of claim 15, wherein the one or more processors are further configured to:
receive instructions to synchronize the first version of the collection of content items and the second version of the collection of content items; and
synchronize the second version of the collection of content items with the first version of the collection of content items by applying the first change to the second version of the collection of content items accessible to the second group of users.

19. The system of claim 18, wherein the one or more processors are further configured to:

send a notification to the second group of users indicating that the second version of the collection of content items is synchronized with the first version of the collection of content items.

20. The system of claim 19, wherein information associated with an interaction with the second version of the collection of content items by a user in the second group of users is maintained in a user account.

21. A non-transitory computer-readable medium including one or more sequences of instructions which, when executed by one or more processors, cause:

maintaining a first version of a collection of content items and a second version of the collection of content items, the first version of the collection of content items and the second version of the collection of content items being accessible to a first group of users, the second version of the collection of content items being accessible to a second group of users, and the first group of users being a subset of the second group of users;

receiving first information associated with a first change to the first version of the collection of content items;

storing, by the content management system, the first change in a change history associated with the first version of a collection of content items, the change history comprises a set of changes associated with the first version of the collection of content items;

applying the first change to the first version of the collection of content items accessible to the first group of users, the first change to the first version of the collection of content items being displayed as a marked version of the collection of content items, wherein the second version of the collection of content items does not include the first change;

receiving, by the content management system, an acceptance message instructing the content management system to apply the first change to the second version of the collection of content items; and upon receiving the acceptance message, applying, by the content management system, the first change to the second version of the collection of content items.

* * * * *